United States Patent [19]
Smith

[11] 3,886,770
[45] June 3, 1975

[54] DOUBLE LOCKING SECURITY APPARATUS
[75] Inventor: Gordon F. Smith, Santa Barbara, Calif.
[73] Assignee: Helistrand, Inc., Santa Barbara, Calif.
[22] Filed: Jan. 2, 1974
[21] Appl. No.: 430,165

[52] U.S. Cl. ............................. 70/18; 70/58
[51] Int. Cl. ............................. E05b 73/00
[58] Field of Search ............ 70/18, 14, 15, 30, 49, 70/57, 58, 225, 226, 227, 233, 234; 24/3 B, 23 W, 115 H, 115 K, 135 R

[56] References Cited
UNITED STATES PATENTS
3,590,608  7/1971  Smyth ................................. 70/58
3,756,008  9/1973  Smith ............................... 70/18 X FOREIGN PATENTS OR APPLICATIONS
459,690  9/1913  France ............................. 70/227

*Primary Examiner*—Robert L. Wolfe
*Attorney, Agent, or Firm*—Robert E. Geauque

[57] ABSTRACT

An extended length of a continuous element having a pair of looped ends and a loop located intermediate the ends, the continuous element to be extended through the wheels of a bicycle and about the frame of the bicycle and a padlock shackle to be passed through each of the loops thereby creating two separate locking areas which will require that a thief would have to cut through the continuous element at more than one place which slows down the act of thievery and makes apprehension of the thief more likely.

9 Claims, 3 Drawing Figures

PATENTED JUN 3 1975

3,886,770

DOUBLE LOCKING SECURITY APPARATUS

BACKGROUND OF THE INVENTION

The field of this invention relates to locking apparatuses and more particularly to a locking apparatus for movable devices such as bicycles, motorcycles, or any small article which is capable of being readily stolen.

The common form of locking bicycles while left unattended, in order to deter theft, has normally been accomplished by the use of a length of chain or steel cable and padlock. In locking of the bicycle, the chain or cable is passed through the wheels and frame of the bicycle and around some stationary object such as a post. The ends of the chain or cable are brought together and locked with the shackle of a padlock. The conventional chains and cables can be readily cut by bolt cutters or other similar types of cutting apparatuses within a matter of seconds. Therefore, the use of such conventional chains and cables are proving to be ineffective for preventing stealing of bicycles and other such light-weight vehicles.

Recently, a significant improvement has been made in the area of locking devices for a bicycle. Reference is to be had to Applicant's previous U.S. Pat. No. 3,756,008, issued Sept. 4, 1973, entitled Self-Coiling Wire Cable and Method of Forming Same. As a further improvement over the aforementioned patent, there exists a need for a device that will easily and simply independently lock both the front and rear portions of the bicycle using only one padlock. This will require that a thief, in order to pedal the bicycle away, would have to cut through the locking cable at more than one place. This double cutting procedure significantly slows down the act of thievery and makes aprehension of the thief more likely.

SUMMARY OF THE INVENTION

The apparatus of this invention is to employ a length of stranded steel cable which is sheathed in a circular plastic jacket which protects the cable from damage and reduces marking or scuffing of the article being secured. The length of stranded steel cable is arranged with three loops, one at each end and one located intermediate the ends. Each of the loops are approximately 6 inches in circumference. It is preferable that the intermediate loop is formed from the continuous cable element by using a metal collar which binds the cable upon itself to form the intermediate loop. It is preferable that the intermediate loop be located somewhat closer to one end than to the other end. The method of use is to pass the short side of the element through the frame of the bicycle and through the front wheel hooking that end loop to the intermediate loop with the shackle of a padlock so that the wheel is secured to the frame. Then the longer side of the element is then passed through the rear wheel of the bicycle between the rear fork and the lower fork stays and then around a stationery post or other object with that end loop being brought together with the other two loops with the padlock shackle being passed through all three loops.

DETAILED DESCRIPTION OF THE SHOWN EMBODIMENT

Figure 1:
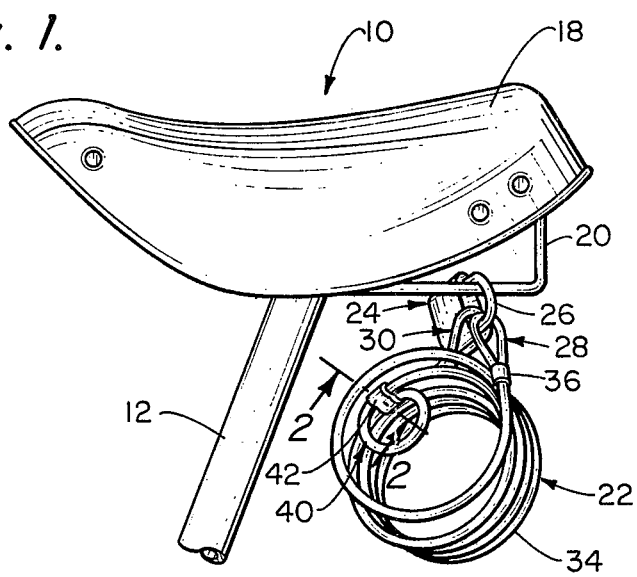
FIG. 1 is a view showing the cable of this invention being stored upon a vehicle such as behind and below a bicycle seat.

Referring particularly to FIG. 1 of the drawing, there is shown a bicycle seat assembly 10 including a mounting shaft 12 which is to be connected to the frame 14 of a bicycle 16. Usually mounted beneath and behind the seat 18 is a bracket 20. The cable security apparatus 22 of this invention is preferably self-coiling and retained upon bracket 20 by means of a padlock 24. The padlock 24 includes a padlock shackle 26. The padlock shackle 26 is conducted around a portion of the bracket 20 and also through the end loops 28 and 30 of the cable 22.

It is considered preferable to employ a stranded wire cable. However, it is considered to be within the scope of this invention to employ the concept of this invention on other than cable such as for example a heavy-duty rope.

Figure 2:
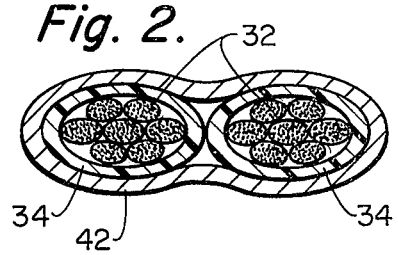
FIG. 2 is a cross-sectional view through the cable of this invention taken along line 2—2 of FIG. 1.
Figure 3:
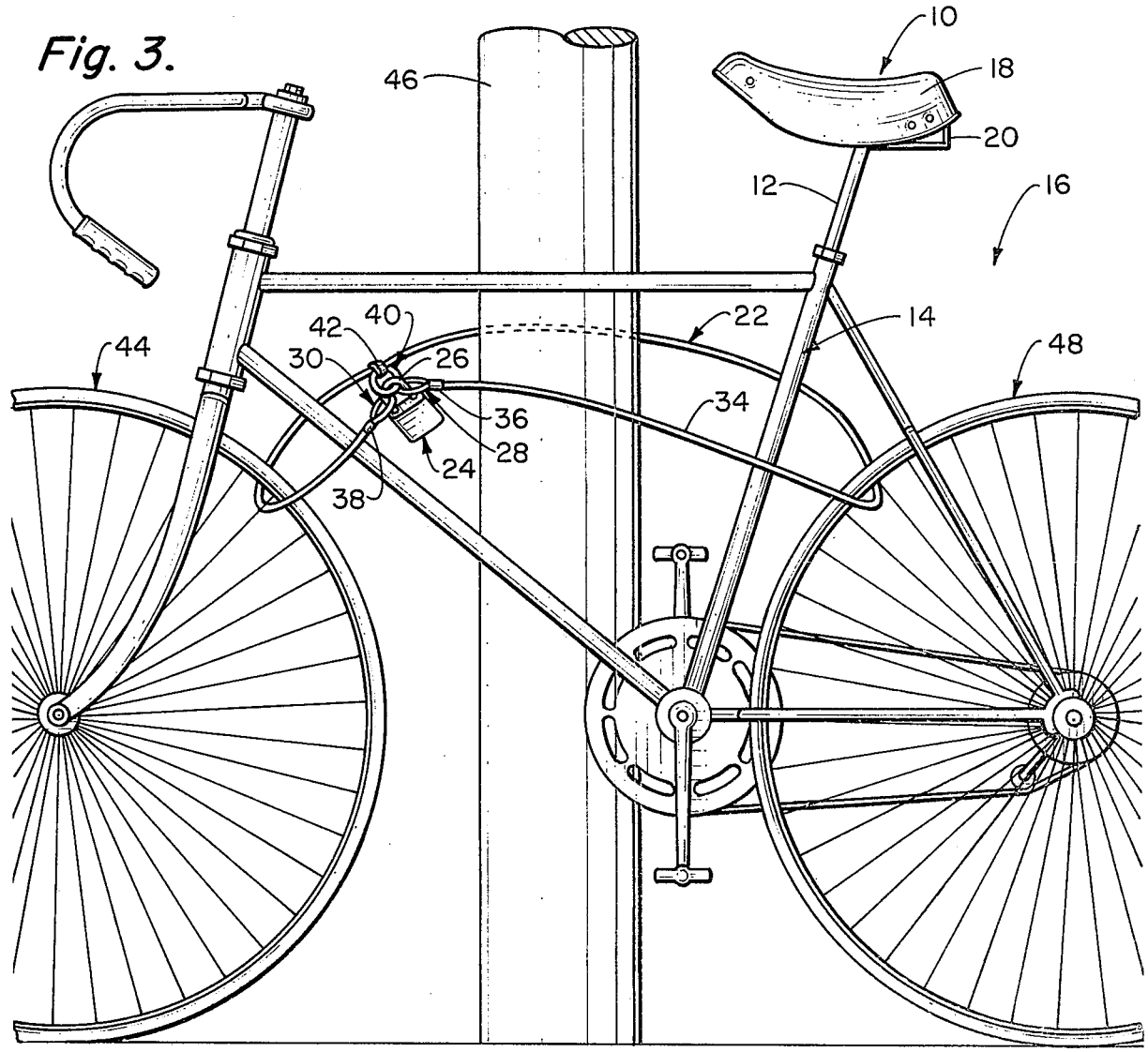
FIG. 3 is a view showing how the cable of this invention is to be employed to lock a bicycle to a fixed object.

Referring in particular to FIG. 2 of the drawing, the cable 22 of this invention is composed of a plurality of strands 32 of wires. Basically, the stranded cable is similar to the cable defined within the aforementioned U.S. Pat. 3,756,008 and reference is to be had thereto for details of construction. The twisted strands 32 are covered with a plastic sheath 34. The plastic sheath will prevent marring or scratching of any painted surface upon which the apparatus is used, such as the frame of the bicycle.

Loops 28 and 30 are formed by the binding of the cable upon itself by means of collars 36 and 38. The collar is normally metal and is crimped by a machine to bind the two sections of cable together. The circumference of the loops 28 and 30 is preferably about 6 inches.

Formed intermediate the loops 28 and 30 is an intermediate loop 40. The intermediate loop 40 is formed in a similar manner by the use of a collar 42 which is to bind the cable upon itself. The intermediate loop 40 is also to have a circumference of about 6 inches. The collar 42 is basically similar to collars 36 and 38.

The length of each of the collars 36, 38 and 42 is considered to be critical since the longer the collar the easier it is to cut the cable in the area of the collar. It has been found that a short collar, which is attempted to be cut, will not provide additional support for the cable under the action of a cutting apparatus such as a bolt cutter. Therefore, collar length of usually no more than three times the bare cable diameter is desirable.

The particular size of the wires located within each strand 32 is preferably between 0.005 and 0.012 of an inch. Twelve thousandths of an inch is equal or less than the closed clearance of the jaws of a standard bolt cutter. Thus, it is apparent that the bolt cutter will miss some of the wires during the cutting operation. The small wire size also allows the bundle of strands to flatten out rather than to be cut by the pressure of the bolt cutter. Therefore, it makes it substantially more difficult to cut the cable of this invention. The preferable cable diameter is three-sixteenths of an inch.

It is normally preferable that the cable 22 be about 6 feet in length. The intermediate loop 40 is to be positioned about 1½ feet from one of the ends of the cable. The short length of the cable is to be conducted through the spokes of the front wheel 44 of the bicycle 16. The long end of the cable is to be conducted around a fixed object 46 such as a post and through the rear wheel 48 of the bicycle 16. The shackle 26 is passed through loops 28, 30 and 40 and the padlock 24 is then locked.

In order for a thief to extract the bicycle 16 from the post 46 and then to remove the cable 22 from the bicycle 16, the thief must make two separate cuts. There are in effect, two separate locking areas created. The thief must cut through the longer length of cable which is conducted through the rear wheel in order to remove the bicycle from the fixed object 46. However, the front wheel 44 of the bicycle is still locked to the frame and in order for the thief to ride the bicycle the shorter length of the cable must also be cut. Therefore, the time to effect the cutting of the cable is substantially increased and greatly increases the chance that the thief may be caught or give up prior to completion of the cutting.

The cable 22 is preferably coiled so that when it is in its natural state is in the position shown in FIG. 1 of the drawing. The apparatus and method of coiling the cable is clearly described within the aforementioned U.S. Pat. No. 3,756,008 and reference is to be had thereto. The cable of this invention is to have a total weight of 9 ounces which does not add a significant amount of weight to light-weight bicycles. It has been found that on the average it takes from 10 to 20 times longer to cut the cable of this invention with hand tools then to cut a hardened chain which can be easily cut with bolt cutters in two simple cutting movements. When actual tests were conducted it took a bolt cutter 130 seconds to cut the cable of this invention where the same bolt cutter cut a case hardened chain which is normally used as a bicycle lock in 2 seconds.

It is to be understood that the intermediate loop of this invention is an auxilliary to the cable. It is not just a connecting part as a link in a chain. It is not uncommon that in cutting one side of a chain link that the other side of the link will break. This is particularly true in a hardened chain. Although it takes more strength to effect a cutting of the chain with bolt cutters, once the cut is completed both sides of the link will fail. Therefore, if the links of a chain are attempted to be used in the manner of this invention, that frequently a single cutting of the intermediate chain link results in complete failure of the locking apparatus.

Using the apparatus of this invention, it is absolutely required to make two separate cuts in order to cut through the cable of this invention. If the intermediate loop is cut, there still is the overall cable structure which must also then be cut. If the cable section defining the back locking area is cut, then the cable defining the forward locking area must then be cut. The same is true in reverse. Additionally, by using the cable of this invention, it is extremely difficult for a normal pair of bolt cutters to cut completely through the cable because of the tendency of the cable to mash together during the cutting operation. As a result, it becomes a rather lengthy procedure for a perspective thief to make two separate cuts in order to effect thievery of the bicycle. This lengthy procedure acts as a deterrent to stealing of the bicycle which has been locked with the cable of this invention.

What is claimed is:

1. A double locking security apparatus comprising:
an extended length of a continuous constant diameter cable having a pair of ends;
a first loop attached to one of said ends and a second loop attached to the other of said ends; and
a third loop connected to said continuous cable intermediate said first and second loops, said third loop being an integral part of said continuous cable and forming a full circle, said continuous cable being extendable around an article and the shackle of a padlock is to be passed through each of said loops thereby creating two separate locking areas within the confines of said continuous cable.

2. Apparatus as defined in claim 1 wherein:
said third loop being located approximately one-fourth of the total cable length from one of said ends.

3. Apparatus as defined in claim 1 wherein:
said cable constructed of a plurality of separate preformed and twisted strands, said cable when at rest comprising a plurality of self-coiling helical coils located between said first and second loops in order to shorten the distance between said loops when said device is not in use, said helical coils permitting said loops to extend apart a distance of substantially that of the total cable length in order to extend said cable.

4. A locking security apparatus for locking together two articles to prevent substantial movement of one relative to the other, said apparatus comprising:
a cable adapted to interconnect each of said articles, said cable constructed of a plurality of separate preformed and twisted strands;
said cable having a loop at each end adapted to receive a locking means placed through both of said loops;
said cable when at rest comprising a plurality of self-coiling helical coils located between said loops in order to shorten the distance between said loops when said device is not in use;
said helical coils permitting said loops to be extended apart a distance substantially that of the total cable length in order to extend said cable the distance to interconnect said articles so that said loops are located adjacent one another for receiving said locking means; and
an intermediate loop connected to said cable intermediate said loops at each said end, said intermediate loop being integral with said continuous cable and forming a full circle, said locking means to be also received within said intermediate loop, whereby within the confines of said cable there is created two separate locking areas.

5. Apparatus as defined in claim 4 wherein:
a plastic covering means surrounding said cable to thereby prevent said cable from marring painted surfaces.

6. Apparatus as defined in claim 5 wherein:
said plastic covering comprising a covering of material surrounding said cable in a tight-fitting manner.

7. Apparatus as defined in claim 6 wherein:
said wires forming said cable will be constructed of metallic material and of a diameter within the range of 0.005 and 0.012 inches.

8. Apparatus as defined in claim 7 wherein:

the diameter of said cable being substantially three-sixteenths of an inch.

9. Apparatus as defined in claim 4 wherein:
a collar connected to said cable to hold said intermediate loop in the looped position, said collar having a length of less than three times the bare cable diameter.

* * * * *